United States Patent [19]

Uehara et al.

[11] Patent Number: 4,931,953

[45] Date of Patent: Jun. 5, 1990

[54] CHARACTER PATTERN GENERATION METHOD AND SYSTEM THEREFOR

[75] Inventors: Tetsuzou Uehara; Motohide Kokunishi, both of Tokyo; Kenji Shimoi, Tokorozawa; Hideko Kagimasa, Hachiouji, all of Japan

[73] Assignee: Hitachi, Ltd., Tokyo, Japan

[21] Appl. No.: 186,381

[22] Filed: Apr. 26, 1988

[30] Foreign Application Priority Data

Apr. 30, 1987 [JP] Japan .................................. 63-104246

[51] Int. Cl.$^5$ .............................................. G06F 15/40
[52] U.S. Cl. .................... 364/518; 340/739; 382/55
[58] Field of Search ........................ 364/518, 521, 523; 382/54, 55; 340/721, 723, 727, 739

[56] References Cited

U.S. PATENT DOCUMENTS

| | | | |
|---|---|---|---|
| 4,601,002 | 7/1986 | Rosenthal | 364/518 |
| 4,672,370 | 6/1987 | Yu | 340/739 |
| 4,674,059 | 6/1987 | Schrieber | 364/523 |
| 4,675,830 | 6/1987 | Hawkins | 364/518 |
| 4,675,833 | 6/1987 | Cheek et al. | 364/523 |

Primary Examiner—Gary V. Harkcom
Assistant Examiner—H. R. Herndon
Attorney, Agent, or Firm—Fay, Sharpe, Beall, Fagan, Minnich & McKee

[57] ABSTRACT

A line thickening method and system therefor, which holds skeleton line data of characters consisting of the kinds of lines relative to the types of shapes of lines comprising a character and sequence of coordinates of a plurality of points providing the end positions of the skeleton lines, the thickening process utilizes the kinds of lines of the end positions of the skeleton lines inside a character box for each character, and whenever necessary, one of a plurality of processes is selected for thickening, wherein thickening width data are previously stored for the right and left sides of the direction of each skeleton line viewing from one of the end positions of the skeleton line.

12 Claims, 12 Drawing Sheets

FIG. 4

| CHARACTER CODE | LENGTH OF INFORMATION OF CHARACTER (L) |
|---|---|
| STROKE NUMBER ('1') | LENGTH OF THIS STROKE INFORMATION ($L_1$) |
| '0' ANGLE OF DIRECTION OF THICKENING $\alpha_{11}$ | '0' ANGLE OF DIRECTION OF THICKENING $\alpha_{12}$ |
| OTHER ONES FOR STROKE 1 | |
| '1' RIGHT DIRECTION THICKNESS $R_{11}$ | '2' LEFT DIRECTION THICKNESS $L_{11}$ |
| OTHER ONES FOR STROKE 1 | |
| STROKE NUMBER ('2') | LENGTH OF THIS STROKE INFORMATION |
| ANGLES OF DIRECTION OF THICKENING AND THICKNESS INFORMATIONS FOR STROKE 2 | |
| STROKE INFORMATIONS FOR OTHER STROKES OF THE CHARACTER | |

| STROKE KIND (S) | | LENGTH OF INFORMATION | |
|---|---|---|---|
| '0' | ANGLE | '0' | ANGLE |
| '0' | ANGLE | '0' | ANGLE |
| OTHER ONES | | | |
| '1' | RIGHT DIRECTION THICKNESS | '2' | LEFT DIRECTION THICKNESS |
| '1' | RIGHT DIRECTION THICKNESS | '2' | LEFT DIRECTION THICKNESS |
| OTHER ONES | | | |

FIG. 13

| CHARACTER CODE | | LENGTH OF INFORMATION OF CHARACTER | |
|---|---|---|---|
| STROKE NUMBER | | LENGTH OF THIS STROKE INFORMATION | |
| '0' | ANGLE OF DIRECTION OF THICKENING | '0' | ANGLE OF DIRECTION OF THICKENING |
| OTHER ONES FOR STROKE | | | |
| '1' | THICKNESS | '1' | THICKNESS |
| OTHER ONES FOR STROKE | | | |
| STROKE INFORMATIONS FOR OTHER STROKES OF THE CHARACTER | | | |

CHARACTER PATTERN GENERATION METHOD AND SYSTEM THEREFOR

BACKGROUND OF THE INVENTION

1. Field of the Invention

This invention relates generally to a character pattern generation method and system therefor, and more particularly to a pattern generation method and system therefor which will be suitable for generating an outline pattern consisting of the aggregate of lines of various thickness from the same skeleton pattern with a high quality level.

2. Description of the Prior Art

A method of generating a character pattern having various thickness of lines constituting a character from the same character pattern might be feasible in accordance with thickening processing from skeleton data that has been reported recently (e.g. J. Hobby and Gu Guoan, "A Chinese Meta-Font", Stanford University, Dept. of Computer Science, Report No. STAN-CS-83-974, July, 1983). Japanese Patent Laid-Open No. 147572/1987, which was filed by the same applicant as the applicant of the present invention, is also known as one of the prior art references. This system can generate outline data of various sizes from skeleton data and can provide the thickness of lines constituting a character as parameters. The advantages of this method are that characters of various sizes can be generated from the same skeleton data and the thickness of lines can be set independently of the character size.

These advantages are brought forth by the feature of a skeleton pattern retention system which cannot be accomplished by a character pattern retention/output system by a present dot matrix pattern.

Though the prior art technique described above can change the thickness of lines constituting a character, the line might deviate from the relation of character pattern inherent to a given character if the change of line thickness is too great. In other words, the pattern of a character shape which makes it possible to recognize a given character as the character might be spoiled. Even if the pattern of the character shape is not spoiled completely, quality of the character shape might drop. Furthermore, correlationship between character patterns that constitute one character set might be broken. Let's consider, for example, the characters "H" and "T". There is a rule that the upper side of "H" lies on the same horizontal line as that of "T". However, if thickening processing of lines is carried out in accordance with the prior art technique described above, the upper side of "T" becomes higher with an increasing thickness, though the upper side of "H" remains unchanged. Though the lower part of the left-hand radical " " of the Chinese character " " does not change by the thickening processing in accordance with the prior art method described above, the lower end of the right-hand radical of the character " " moves downward by the thicknening processing.

The above will be explained more definitely with reference to FIG. 7. This drawing illustrates a definite example of a character and represents the outline generation method, its thickness control method and its problems in accordance with the prior art technique described already. In FIG. 7, (7-1) represents the skeleton line data of the alphabet letter "H" and (7-3) and (7-5) are its outline patterns. The thickness of line constituting the character is different between (7-3) and (7-5). In FIG. 7, (7-2) represents the skeleton line data of the character "T" and (7-4) and (7-6) are its outline patterns. In each drawing of FIG. 7, the rectangle of dash lines encompassing the character pattern represents a character box and a white circle represents a skeleton point. In (7-1) and (7-2), the lines connecting the skeleton points represent the skeleton lines.

The skeleton line data include data representing the coordinate sequence and the kind (hereinafter may be called stroke kind) of lines. In the case of the character "T" in (7-2), the lines constituting the character are two. The first has the kind "horizontal-line stroke" having two skeleton points at the extreme right and left edges. The second has the kind "vertical-line stroke" having two skeleton points at the upper and lower ends. In (7-1) and (7-2) in FIG. 7, the skeleton points among these skeleton line data are represented by white circle and are connected mutually within the same line. The kind of the skeleton lines is omitted from the drawing.

Referring to FIG. 7, (7-3) and (7-5) represent the outline pattern of the character "H" generated from (7-1) and the thickness data. Similarly, (7-4) and (7-6) represent the outline pattern of the character "T" generated from (7-2) and the thickness data. In the drawings from (7-3) to (7-6), white circles represent the skeleton points of the skeleton line data, while black circles are generated from the skeleton line data (kinds of lines are also involved besides the skeleton point positions) and the thickness data and are referred to as "characteristic points of the outline curve". In the generated outline pattern data are contained the coordinate sequence of these characteristic points of the outline curve and the kind of curves interpolating between the points.

Since the outline curves of the character shown in FIG. 7 are all straight lines, the kind "straight line" is generated as the kind of curves for interpolating between each pair of characteristic points of outline curve. Though this kind is not put into FIG. 7, the characteristic points of outline curve are connected by the straight lines in accordance with the meaning of this kind so as to represent clearly the outline pattern.

Next, how the thickness data is used for the generation of the outline pattern will be explained. First of all, the "vertical-line stroke" as the first line of the character "H" will be considered. The skeleton point of this "vertical-line stroke" are given as the coordinates of the point 731 and the point 732 of (7-3). In the generation of the outline pattern, the coordinates of each of the points 733, 734, 735 and 736 as the characteristic points of outline curve by the thickness data as well as the kind of curve connecting each point (all the curves being the "straight lines" in this case) are determined, by the coordinates of these two points and the stroke kind of the line, i.e. "vertical-line stroke", and thickness data of the line. Among them, the thickness data is involved with the determination method of the coordinates of the characteristic points of outline curve. The angle between the straight line connecting the characteristic points of outline curve 733 and 734 and the skeleton lines 731-732 or the angle between the straight line and the horizontal line of the character box is determined by the stroke kind of the line. Points 733 and 734 are determined by plotting them on the line passing through the skeleton point 731 and determined by the angle described above in the distance from the skeleton point 731 which corresponds to half of the value of the corresponding thickness data on both sides of the skeleton point 731. Points 735 and 736 are determined in the same way. FIG. (7-5) shows the outline pattern obtained when the thickness of each line constituting the character "H" is smaller than that of FIG. (7-3). Incidentally, the line thickness data is not given to the character but to each line constituting the character. Therefore, it is possible to form one character by a plurality of lines having different thickness.

Next, the generation method of the outline pattern of the character "T" will be considered with reference to (7-4) and (7-6) of FIG. 7. In FIG. (7-4), reference numerals 741 and 742 represent the skeleton points of the "horizontal-line stroke" as the first line of "T" and reference numerals 743, 744, 745 and 746 represent the characteristic points of outline curve. The description of the generation method of the characteristic points of outline curve will be omitted because it is the same as that of (7-3).

FIG. (7-6) shows an example of the outline pattern which is generated by use of a set of thickness data having smaller values than in the case shown in FIG. (7-4). Here, reference numerals 761 and 762 represent the skeleton points in the same way as above and reference numerals 763, 764, 765 and 766 represent its characteristic points of outline curve. FIGS. (7-3) and (7-5) show the outline patterns generated by giving different thickness data to the single skeleton line data of "H". FIGS. (7-4) and (7-6) show the outline pattern generated by giving different thickness data to the single skeleton line data of "T". When the inside of the outline curve of each outline pattern is filled, a character pattern having the thickness of line can be obtained. The thickness of line must be balanced inside the same character set. From this aspect, "H" in FIG. (7-3) and "T" in FIG. (7-4) can be regarded as the characters of the same character set and "H" in FIG. (7-5) and "T" in FIG. (7-6) can be regarded as the characters of the different character sets. However, the line positions between the characters must be taken into consideration in addition to the balance of the thickness of lines between the characters. From this point, this system is not free from the problem. Let's consider the upper end line when each of the characters "H" and "T" are filled. In the character "H" shown in FIG. (7-3), the upper end line is the line that connects the characteristic points of outline curve 733 and 734, and this line lies on the same stright line as the corresponding outline line of another connecting line of the character "H". In the character "T" in FIG. (7-4), on the other hand, the upper end line corresponds to the line that connects the characteristic points of outline curve 744 and 746. The upper end line of "H" in FIG. (7-3) is in agreement with that of "T" in FIG. (7-4). However, in the case of "H" in FIG. (7-5) and "T" in FIG. (7-6) where the thickness of each line is reduced, their upper end lines are not in agreement. The upper end line of "H" exists at the same position irrespective of its thickness. In contrast, the upper end line of "T" rises when the thickness of line is increased and lowers towards the skeleton line when the thickness is decreased. Such an unbalance occurs between different lines inside the same character. The Chinese characters such as "   " and "   " described above are such examples. As can be understood from the description given above, the prior art technique involves the limitation that quality of the characters generated by the thickening processing is not high and if the high quality characters are to be generated, the width of thickness must be limited within a short range.

SUMMARY OF THE INVENTION

It is therefore an object of the present invention to provide a character pattern generation method and its system which can execute thickening processing without causing the problems with the prior art technique described above.

In a character pattern generation system including means for holding skeleton line data consisting of the stroke kind of lines providing the type of shapes of lines constituting a character and coordinates consisting of a plurality of points providing its position and generating the outline of lines constituting the character on the basis of them, the object of the invention described above can be accomplished by the character pattern generation method and its system characterized in that a system for thickening the skeleton line is determined by the kind described above, that the invention has a plurality of functions for thickening the thickness of skeleton line on the basis of thickness data determined by a plurality of references and that when certain thickening processing is carried out, one of a plurality of functions described above is selected and thickening processing is executed by the selected function.

BRIEF DESCRIPTION OF THE DRAWINGS

FIG. 4 shows thickness data;

FIG. 13 shows a modified example of the thickness data of FIG. 4.

DESCRIPTION OF THE PREFERRED EMBODIMENTS

Figure 1:
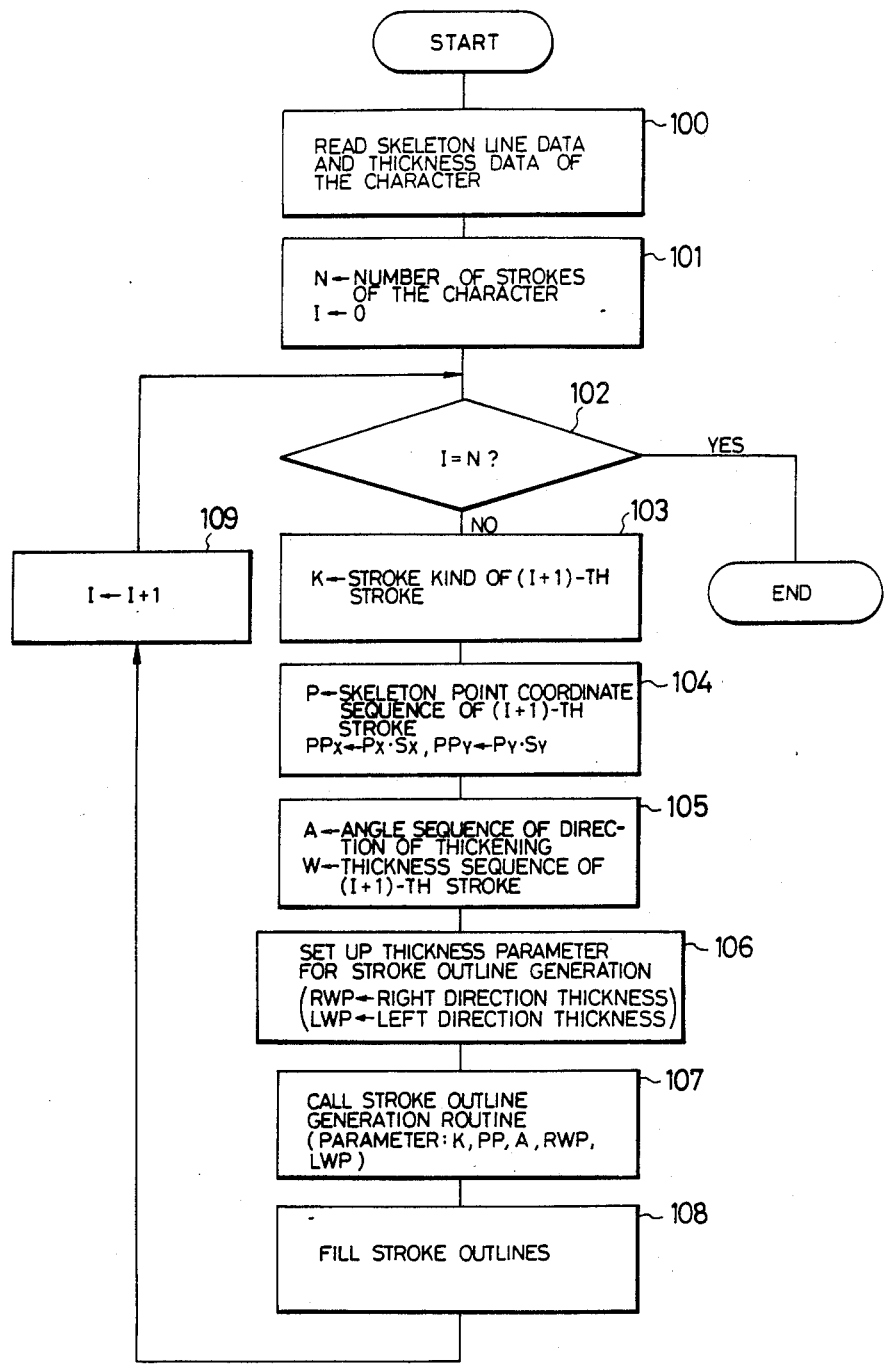
FIG. 1 is a flowchart when the character pattern of one character is generated.

First of all, the summary of the concept of the present invention will be described.

The problem with the prior art technique results from the fact that it prepares only one thickening processing for thickening a given skeleton line on both of its sides. Therefore, the object of the invention can be accomplished by providing means for improving the thickening processing. In other words, the object can be accomplished by processing means capable of changing the result of thickening processing by utilizing the kind data of line given to the skeleton line or by utilizing the position data of the skeleton line inside a character box among the skeleton line data, or by thickening processing means capable of changing, whenever necessary, a thickening method which holds data for distinguishing the thickening width either on the right side or the left side of the skeleton line in the thickness data and thickens the line for each corresponding skeleton line.

More definitely, the means described above include the following three means.

(1) Thickening processing means for holding thickness data for each thickening direction and applying the thickening width in the thickness data for each thickening direction inside the thickness data.

(2) Thickening processing means which, though not holding the thickness data for each thickening direction, determines whether the thickness given by the thickness data in accordance with the stroke kind of the line held in the skeleton line data is to be generated on the right side or the left side in the skeleton line direction or whether each half of the thickness given by the thickness data is to be generated on each of the right and left sides in the skeleton line direction, and accomplishes the thickening processing.

(3) Thickening processing means which, though not holding the thickness data for each thickening direction, determines the direction of application of the thickness data to any one of the right side, the left side and both sides, in accordance with the value of the position data of the skeleton line in the skeleton line data or with the combination of the position data with the stroke kind of line described above. in the same way as in item (2) described above.

The skeleton line data consists of the position coordinate of the skeleton point as the principal point on each skeleton line constituting the character and the stroke kind of line providing the type of shapes of the skeleton line. If the thickness of each skeleton line is determined in addition to these data, the outline curve can be generated by thickening each skeleton line in accordance with the afore-mentioned prior art technique.

More definitely, the action of each of the three kinds of technical means described above will be clarified in order to describe the technique described above.

(1) The case of means (1):

The thickness data held include the right-hand thickness data and the left-hand thickness data. The skeleton line data of the character is given to each line constituting the character. The thickness data is made to correspond to this line. Therefore, the outline pattern of the skeleton line is generated by determining the skeleton line by the position coordinate sequence of the skeleton points in the skeleton line data of the character and the stroke kind of the line, providing the width of the left-hand thickness data of the skeleton line on the left side, when the subsequent skeleton point is viewed from the first skeleton point, and providing similarly the width of the right-hand thickness data of the skeleton line on the right side. If the procedures described above executed for each skeleton line constituting the character, the outline pattern of each line of the character can be generated.

(2) The case of means (2):

The skeleton line is determined in accordance with the position data of the skeleton points in the skeleton line data and with the stroke kind of line, in the same way as in the item (1). Whether the skeleton line is to be thickened on the right side or on the left side, or on both sides, is determined in accordance with the stroke kind of line. The total quantity of the width to be thickened is the thickness data of this line. If the line is thickened on both sides, the thickening width on each side is the half of the thickening width determined by this thickness data. (3) The case of means (3):

The determination method of the skeleton line and its thickening method are the same as those described above. The method of determining the thickening direction is either one of the following. The first method determines the thickening method in accordance with the value of the position data of the skeleton line. If, for example, the skeleton line is drawn from the left to the right at the upper end of the character box, the thickening method is in the right-hand direction.

Another method determines the thickening direction in accordance with the combination of the stroke kind of line of the skeleton line and the position data of the skeleton line. In either case, one of the thickening directions of the right-hand direction, the left-hand direction and both directions is selected. The thickening quantity is determined as the value of the thickness data corresponding to the line in question and if the line is thickened in both directions, the half value of the value of the thickness data is used in the same way as in the means (2).

The foregoing and other objects, advantages, manner of operation and novel features of the present invention will be understood from the following detailed description when read in connection with the accompanying drawings.

Figure 2:
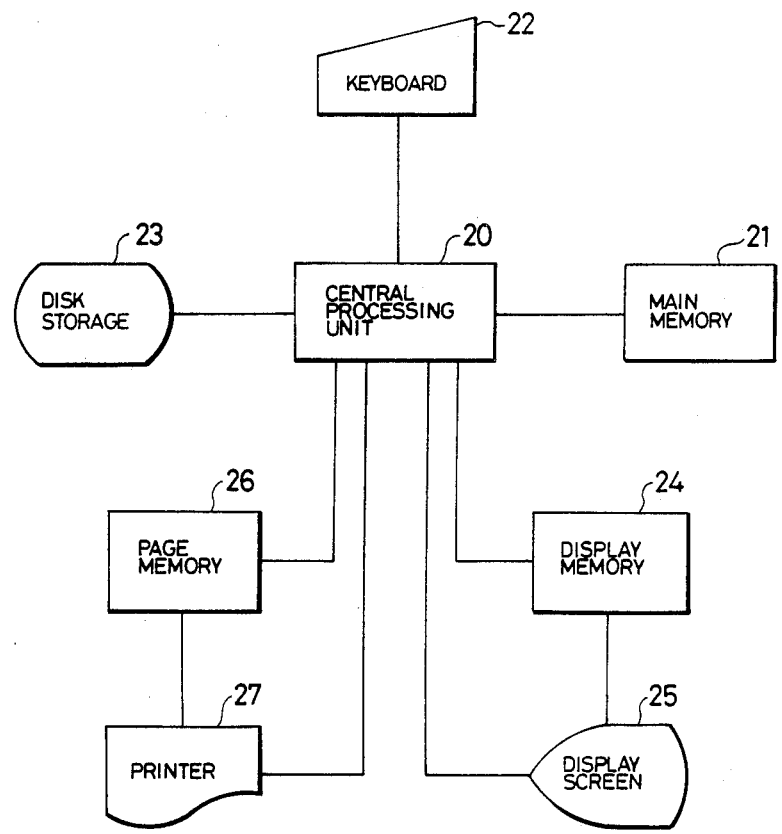
FIG. 2 shows the structure of a text output system when characters are displayed/outputted by a character pattern generation method of the present invention.

FIG. 2 shows the structure of a text output system for displaying/outputting the character in accordance with the character pattern generation system of the present invention. In FIG. 2, reference numeral 20 represents a central processing unit, 21 is a main memory, 22 is a keyboard, 23 is a disk storage, 24 is a display memory, 25 is a display screen, 26 is a page memory and 27 is a printer. The central processing unit 20 executes a program stored in the main memory 21. The keyboard 22 designates the name of the text data to be displayed/outputted and the distinction between the display screen and the printer as the display/output devices. The disc storage 23 holds the text data represented as the line of the character codes and the character pattern data representing the shape of each character of the character set. The program of this system which is executed by the central processing unit 20 accomplishes the character pattern generation system of the present invention. reads the character pattern data from the disc storage 23 into the main memory 21, reads further the text data designated by the keyboard 22 from the disc storage 23 into the main memory and generates the character pattern in accordance with the character pattern data for each character code constituting the text data. When the output device designated by the keyboard 22 is the display screen 25, the character pattern is generated in the display memory 24 and after being filled, is outputted to the display screen 25.

When the output device designated by the keyboard 22 is the printer 27, the character pattern is generated in the page memory 26 and after being filled, is outputted to the printer 27.

Figure 3:
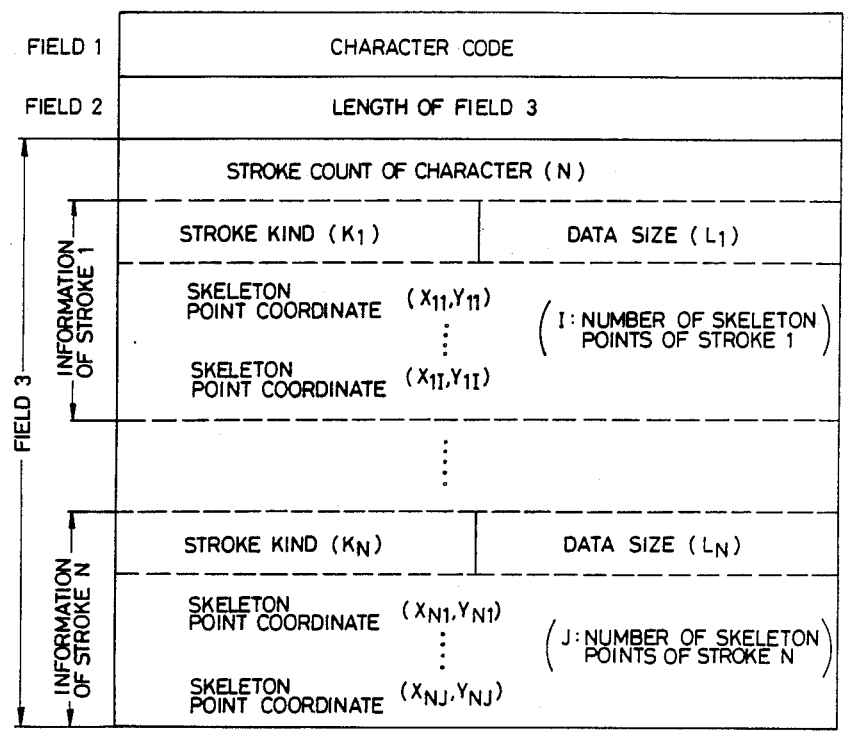
FIG. 3 shows skeleton line data.

Next, the operation of this program will be described in further detail. First of all, the content and system of the character pattern data are shown in FIGS. 3 and 4.

The principal portion of the character pattern data is the skeleton line data. FIG. 3 shows the content and system of the skeleton line data for one certain character. This skeleton line data consists of three kinds of fields. The first field or field 1 represents a character code and the second field or field 2 represents the length of the third field or field 3. The field 3 is the principal portion of the skeleton line data of this character and its size changes with a character. The stroke count of character (N) constituting the character is held at the start of the field 3 and N informations of stroke continue in succession. The content of each information of stroke is as follows. Namely, it consists of the line of the stroke kind, the data quantity of the information of this stroke and the skeleton coordinate (X, Y) of this stroke in order named.

FIG. 4 shows the content and system of the thickness data in the character pattern data. First of all, the direction of the skeleton line will be defined before the explanation of this drawing. The skeleton line is obtained by connecting the skeleton points constituting the line of a character in the sequence stored in the skeleton line data. Among them, the direction of vector drawing from the ith skeleton point to the i+1th skeleton point is referred to as the direction of the skeleton line by these skeleton points. FIG. 4 first includes the character code, then the length of the thickness information of this character and thereafter the thickness information for each stroke constituting the character. This is referred to as the stroke thickness information, which includes the stroke number as the appearance sequence number of this stroke inside the character, then the length of this stroke thickness information and thereafter the line of the angle of direction of thickening of this stroke and the line of thickness. Their definite meaning will be explained later with reference to FIG. 9.

Figures 8, 9:
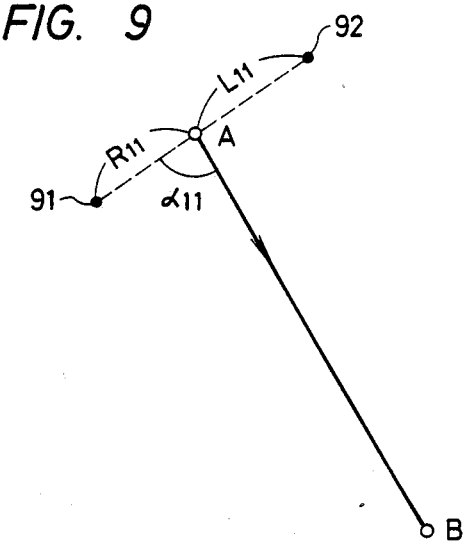
FIG. 8 shows thickness data as a modified example of the embodiment of the present invention.
FIG. 9 is an explanatory view useful for explaining the means of thickening processing by the skeleton line data and the thickness data.

The character "0" is put before the angle of direction of thickening as the identifier representing it. The angle of direction of thickening provides the direction of thickening when the outline is generated from the skeleton points by the thickening processing. The line of thickness consists of a pair of the right direction thickness and the left direction thickness. In order to represent the thickness in the right direction and the thickness in the left direction, the identifiers "1" and "2" are put before these information, respectively. Here, the term "right and left directions" represents the direction when the direction of the skeleton line is viewed. FIG. 9 shows the role of the information in the generation of the outline pattern when the value of the angle of direction of thickening is $\alpha_{11}$, the value of the right direction thickness is $R_{11}$ and the value of the left direction thickness is $L_{11}$, for a skeleton line AB connecting the skeleton points A and B in this order. The first number in $\alpha_{11}$ and the like represents the stroke number and the second number represents the skeleton point number inside the stroke.

In FIG. 9, an arrow is put onto the line connecting the skeleton points A and B in order to represent the skeleton line direction. Reference numerals 91 and 92 represent the characteristic points of outline curve thus generated. When a straight line is drawn at an angle $\alpha_{11}$ to the skeleton line AB as shown in the drawing, the characteristic point of outline curve 91 exists at the point which is apart by a distance $R_{11}$ from A on this line in the right direction towards the skeleton line. The characteristic point of outline curve 92 exists at the point which is spaced by a distance $L_{11}$ from A on the same line in the left direction towards the skeleton line direction. The characteristic points of outline curve are similarly determined for the point B, too, by use of the angle of direction of thickening and the thickness value, and when these characteristic points of outline curve are connected by a predetermined interpolation curve, there can be obtained the outline curve. The above explains the content of the thickening processing.

Next, the correspondence between the stroke information given by FIG. 3 and the thickness information of FIG. 4 will be explained. Since each of these information includes the character code at the start, the correspondence in the character code unit is obvious. Next, the correspondence in the stroke unit can be established by obtaining the stroke number of FIG. 4 by the sequence number of the stroke information of FIG. 3. Next, the correspondence between the skeleton point pair in the stroke of FIG. 3 and the line of the angle of direction of thickening and the line of thickness will be considered. This can be established by determining in advance the skeleton points providing the direction of thickening and the thickness information by the stroke kind of this stroke.

Figure 5:
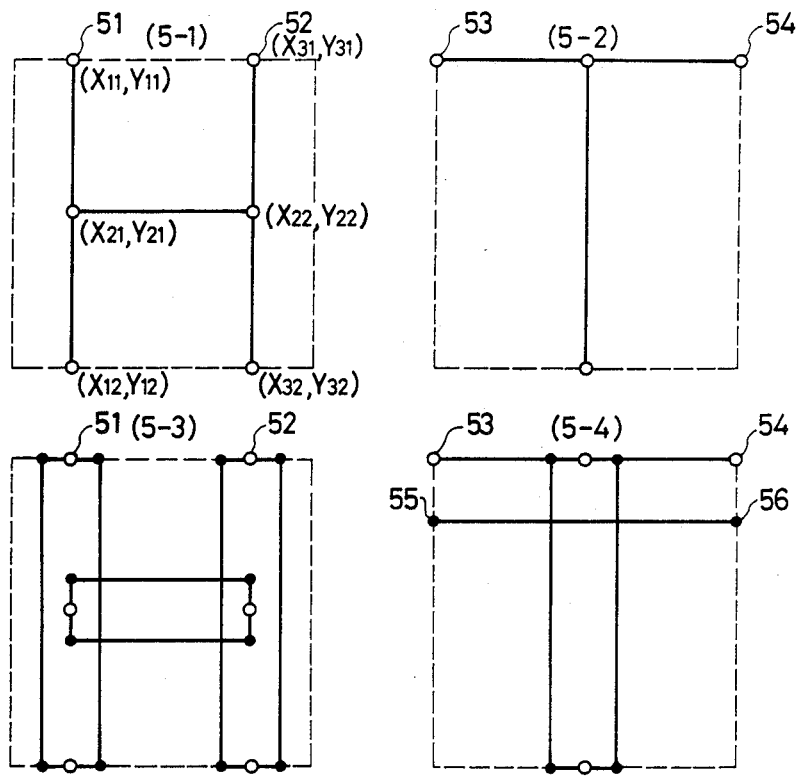
FIG. 5 shows a definite example of thickening processing.

Next, FIG. 5 shows the effect of the thickening processing of the present invention about a definite example of the character. In FIG. 5, (5-1) and (5-2) show the examples of the skeleton line data of the characters "H" and "T", respectively, and (5-3) and (5-4) show the outline patterns containing the characteristic points of outline curve of the characters "H" and "T" and their skeleton points. The outline pattern (5-3) is generated from the skeleton pattern (5-1) and the outline pattern (5-4) is generated from the skeleton pattern (5-2).

The characteristic point of outline curve is represented by black circle while the skeleton point is represented by white circle. In each drawing, the rectangle of dash line represents the character box. The character "H" consists of three lines, that is, two "vertical-line strokes" and one "horizontal-line stroke" as the stroke kinds. In FIG. (5-1), symbol $(X_i, Y_j)$ corresponds to the skeleton point coordinate in FIG. 3. Each of these lines has simply a uniform thickness on the right and left sides of the skeleton line. Here, the term "right and left directions" of the skeleton line represents the direction when the next skeleton point is viewed from the first skeleton point of the skeleton line data, as described already.

On the other hand, the character "T" consists of two lines, that is, one "horizontal-line stroke" and one "vertical-line stroke". Among them, the "vertical-line stroke" has the uniform thickness on the right and left sides of the skeleton line in the same way as each line of "H" described above. However, this does not hold true of the "horizontal-line stroke" of "T". In other words, as shown in (5-2) of FIG. 5, the skeleton points of the "horizontal-line stroke" are put at the upper end of the character box as represented by reference numerals 53 and 54, and as shown in FIG. (5-4), the thickness is provided on only the right side of the skeleton line extending from the skeleton points 53 to 54 but no thickness is provided on the left side. In this manner, the upper end of the outline pattern is aligned with the upper end of the character box. It is thus possible to align the upper end line of the character "H" with that of the character "T".

Figure 7:
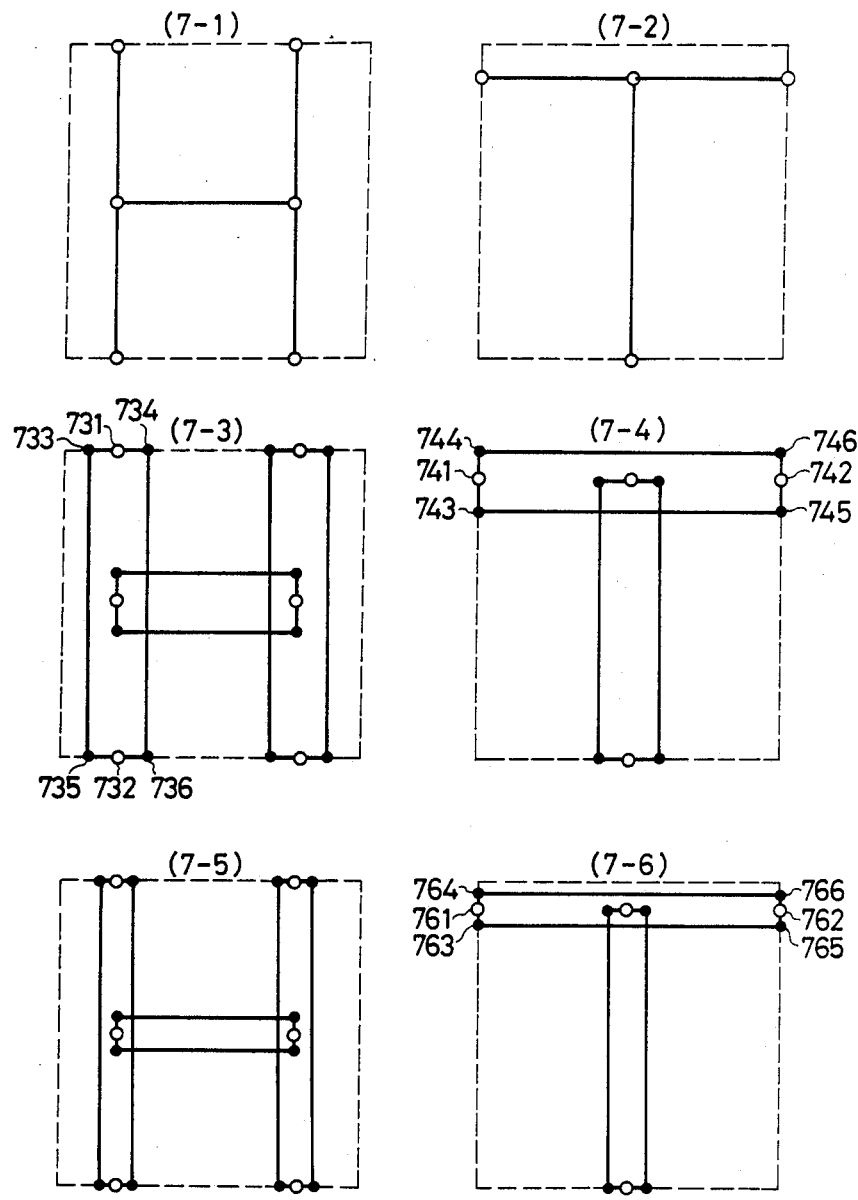
FIG. 7 shows a definite example for explaining the thickening processing in accordance with the prior art technique.

In contrast, if the "horizontal-line stroke" of "T" is handled in the same way as that of "H" and provided with the thickness, there occurs the problem that the same outline pattern as (5-4) can be obtained for a certain size but if the size is smaller than this certain size, the upper end line is at the position lower than that of "H", as described in detail with reference to FIG. 7. What is important when generating the outline such as shown in FIG. (5-4) is that the method of holding the position of the skeleton point and the thickness information and the method of thickening processing.

It will be assumed that the position of the skeleton point is set as shown in (5-2), and the thickness information is held as shown in FIG. 4. The information shown in FIG. 4 will be explained as a definite example of generating the outline pattern (5-4) from the skeleton pattern (5-2). In this case, the character code of FIG. 4 contains the code of the character "T". The stroke number is, first of all, "1", and this corresponds to the "horizontal-line stroke" of "T". The code of the character "0" continues as the identifier in succession to the length of this stroke information and then, two angles of directions of thickening are contained. Among them, the first angle of direction of thickening represents the direction of thickening at the skeleton point 53 while the second angle of direction of thickening represents the direction of thickening at the skeleton point 54. In this case, each angle is 90 degrees. Other angles for the stroke 1 do not exist in this case. Next, the code of the character "1" exists as the identifier and then the right direction thickness of the skeleton line extending from the skeleton point 53 to the skeleton point 54 is held. In this case, its value is the thickness itself of the "horizontal-line stroke". Next, the code of the character "2" exists as the identifier and then the left direction thickness of the skeleton line described above is held. In this case, its value is zero. Thus the stroke information of the stroke number "1" is finished.

Next is the stroke of the stroke number "2". This is the information on the "vertical line" of "T". Two angles of direction of thickening exist for this, too, and each is 90°. The value of the right direction thickness is the same as the value of the left direction thickness and each is half the value of the thickness of the "vertical-line stroke" of "T" in (5-4). The description given above explains the meaning and correspondence between the skeleton line information and the thickness information, the angle of direction of thickening, the meaning of the right and left direction thickening information, the relation between the skeleton pattern and the outline pattern and the definite content of the thickening processing with reference to FIGS. 3, 4, 5 and 9.

Now, the operation of the program of the text output system in this embodiment will be described on the basis of the description given above.

Figure 6:
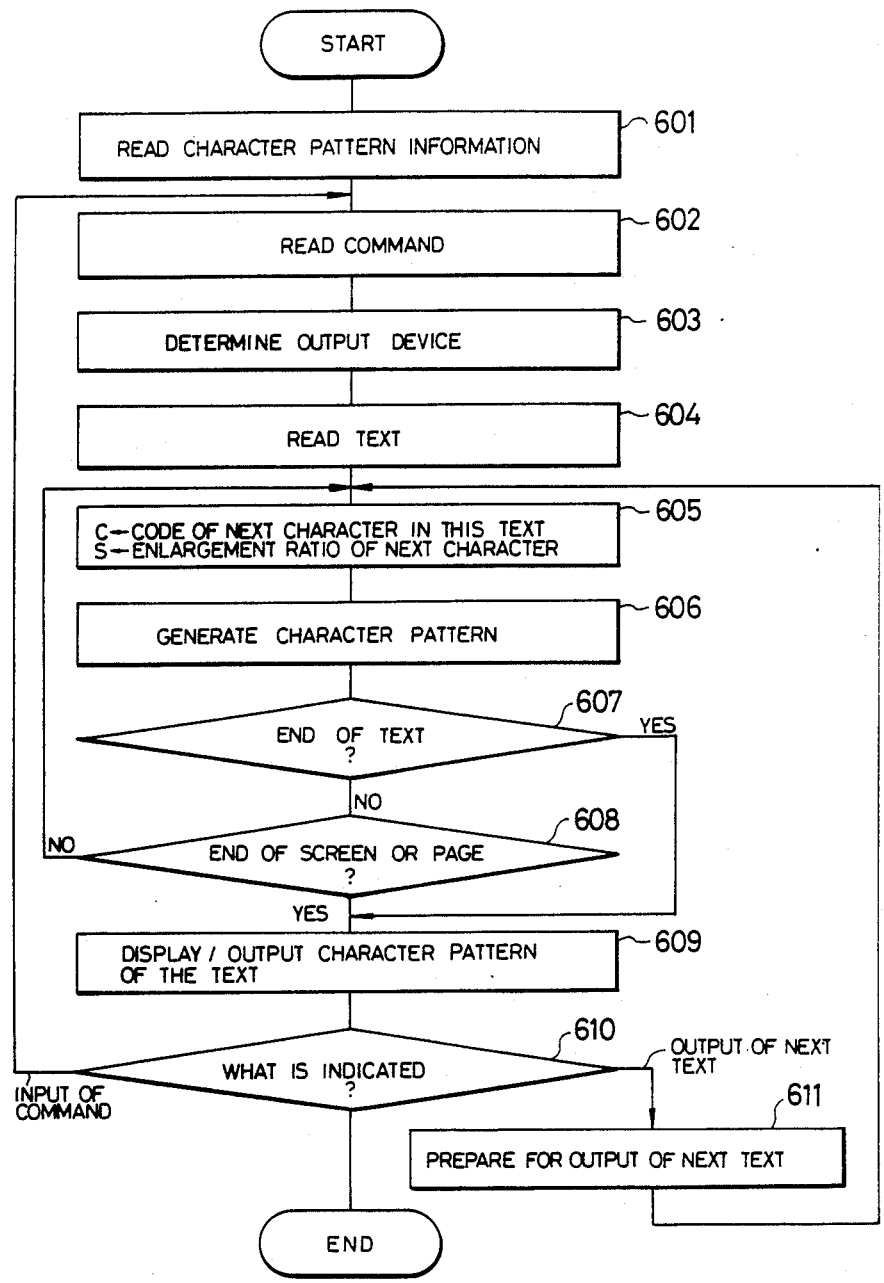
FIG. 6 is a flowchart of the main program and the text output system of FIG. 2.

FIG. 6 shows the outline of the operation of the system. In FIG. 6, processing 601 represents the character pattern information input, which reads the character pattern information from the disc storage 23. Processing 602 represents command input which reads the instruction inputted by an operator from the keyboard 22, and processing 603 is output device determination processing which determines either the display screen 25 or the printer 27 as the text output device in accordance with the character output device designation inputted as the parameter of that command. Processing 604 represents the text read processing which reads the text data as the content of the file having the file name designated by the command of 602. Processing 605 determines the character code of next one character on the text, then determines the scaling factor from the output size of this character from the reference size and sets it to variables C, S. Processing 606 generates the character pattern of this character in the designated size. This processing 606 will be described later in further detail.

Next processing 607 is text end judgement which judges whether or not the character pattern generation has been made for all the text data read in procedure 604, and processing 608 represents the judgement when the judgement of the proceeding step is not the text end. This is the judgement which judges whether or not the generation of the character patterns for one screen has been completed when the output device is the display screen and whether or not the generation of the character patterns for one page has been completed when the output device is the printer. Processing 609 displays or outputs the result of the character pattern generation of the text on the display screen 25 or the printer 27. Thereafter the instruction from the keyboard 22 is awaited in processing 610. The flow proceeds to processing 602 when the operator requests the input of the command, to procedure end when he requests the end and to procedure 611 when he requests the next text display/output. After the preparation of the display/output of the next text is made in processing 611, the flow then proceeds to processing 605.

Here, the content of processing 606 containing the important processing of the present invention will be explained in detail with reference to the flowcharts of FIGS. 1 and others. Processing 606 is a processing for generating the pattern of the scaling factor of the character code C obtained by processing 605.

In FIG. 1, reference numeral 100 represents a read processing for reading the skeleton line data and the thickness data of the character of the character code C from the disc storage 23 into the main memory 21, and reference numeral 101 is an initial setting processing which determines the stroke number of this character in accordance with the skeleton line data that is read in, sets it to the variable N and sets initially the variable I for managing the stroke number for generating the pattern to 0. After the preparation described above is complete, the flow proceeds to the processing which generates the pattern of each stroke.

Reference numeral 102 in FIG. 1 represents a processing which compares I with N and judges whether or not the pattern generation of all the strokes of this character has been complete. If I=N, the pattern generation of all the strokes is complete and the character pattern generation processing is finished. If I is not equal to N, that is, if I<N, the flow proceeds to 103 and so forth because the ungenerated strokes remain. First of all, the processing 103 is a processing which determines the stroke kind of the I+1th stroke, that is, the stroke for which the pattern is to be next generated, from the skeleton line data and sets it to the variable K. In processing 104 in FIG. 1, the skeleton point coordinate sequence of this stroke is set to the array variable P.

The term "skeleton point coordinate sequence" represents the sequence of the skeleton point coordinate of the I+1th stroke information among the skeleton line data shown in FIG. 3. In other words, P is the two-dimensional array which holds sequentially the pair of the X and Y coordinates $(X_i, Y_i)$ of each skeleton point of the I+1th stroke from the first skeleton point. Next, scaling is made in accordance with the scaling factor obtained by processing 605 in FIG. 6. S represents a uni-dimensional matrix consisting of the scaling factor $S_x$ in the X-axis direction and the scaling factor $S_y$ in the Y-axis direction. Each component of the X coordinate sequence $P_x$ of each skeleton point sequence P is multiplied by $S_x$ to obtain $PP_X$ and similarly, $PP_y = P_Y \cdot S_y$ is obtained so as to determine the two-dimensional array $PP = (PP_x, PP_y)$. Next, processing 105 is a processing which determines the angle sequence of direction of thickening of this stroke from the thickness data of this character, sets the angle sequence of direction of thickening to the array variable A and sets the thickening sequence to the array W. Processing 106 is a processing which determines the thickness parameters for generating the stroke outline from W obtained above. These parameters are RWP as the right direction thickening parameter and LWP as the left direction thickening parameter. Processing 106 is one that is the characterizing feature of the present invention and will be therefore described later in further detail with reference to FIG. 10.

Processing 107 is a processing which calls the routine for the outline generation of this stroke using K, PP, A, RWP and LWP obtained above as the input parameters. The stroke outline generation routine generates the outline pattern of this stroke from these parameters on the main memory 21. The detail of this processing will be described in further detail elsewhere. Processing 108 is a filling processing which fills the inside of the outline pattern generated above. It is assumed that the pattern is expressed by two values of "0" and "1" and the outline curve as well as the filling value are expressed by the value "0". The pattern generation of one stroke is finished by processing 108. Processing 109 is a processing which counts up the variable I by 1. It branches to processing 102. In the same way as described above, if $I = N$, the flow is complete and if $I < N$, the flow proceeds to the processing of the next stroke.

The description given above explains the outline of the character pattern generation by FIG. 1. Next, the processing 106 in FIG. 1 will be explained in further detail with reference to FIG. 10.

Figure 10:
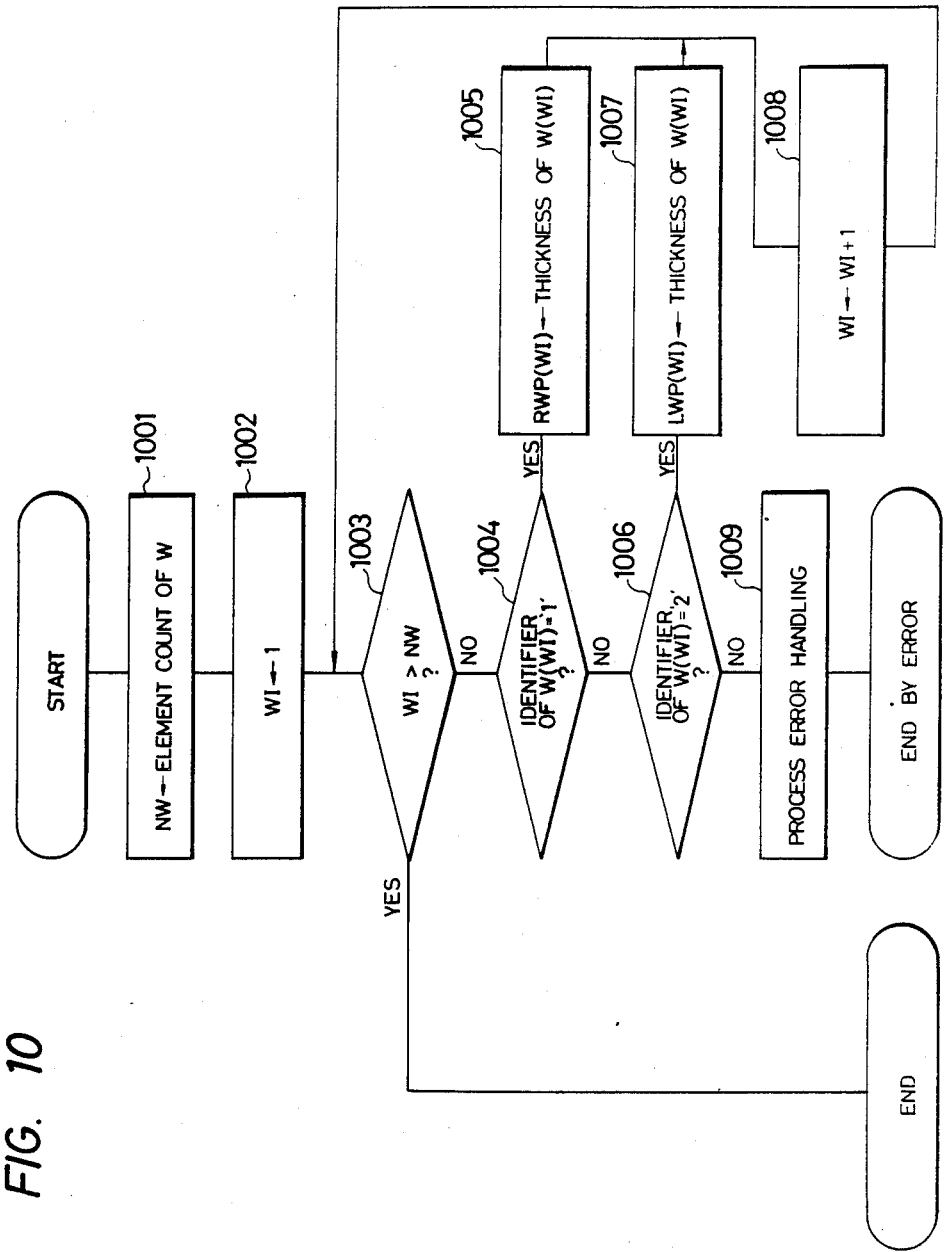
FIG. 10 is a flowchart showing the setting processing of thickness parameters.

Reference numeral 1001 in FIG. 10 represents a processing which sets the element count of the array W to the variable NW. Here, the array W represents the array of information as a unit of the character as the identifier and the thickness. Reference numeral 1002 represents an initialize processing which initializes the variable WI to 1. The variable WI is used as the index of the array W. Processing 1003 is a processing which judges whether or not all the elements of the variable WI have been processed. If $WI > NW$, processing is finished and if not, the flow proceeds to processing 1004. This is a processing which judges whether or not the identifier inside the WIth element of the array W is "1", that is, whether or not it is the identifier for the right direction thickness. If it is, the flow proceeds to processing 1005 and if not, to processing 1006. Processing 1005 is a processing which sets the value of the thickness portion (i.e. right direction thickness) of the WIth element of the array W to the WIth element of the array RWP. Similarly, processing 1006 is a processing which judges whether or not the identifier of W (WI) is "2" and if it is, the flow proceeds to 1007 and if not, to 1009. Processing 1007 is a processing which sets the value of the thickness portion (i.e. left direction thickness) of the WIth element of W to the WIth element of the array LWP. Processing 1009 is an error handling processing. For, it does not happen normally that the identifier of W (WI) is neither "1" nor "2".

After right direction thickness is set to RWI (WI) or left direction thickness is set to LWI (WI) in processing 1005 or 1007, the flow branches to processing 1008. This is a processing which counts up the index WI and then branches to processing 1003. As described above, processing 106 is the processing which sets the right direction thickness sequence to RWP and the left direction thickness sequence to LWP as the thickness parameters for generating the stroke outline.

Figure 11:
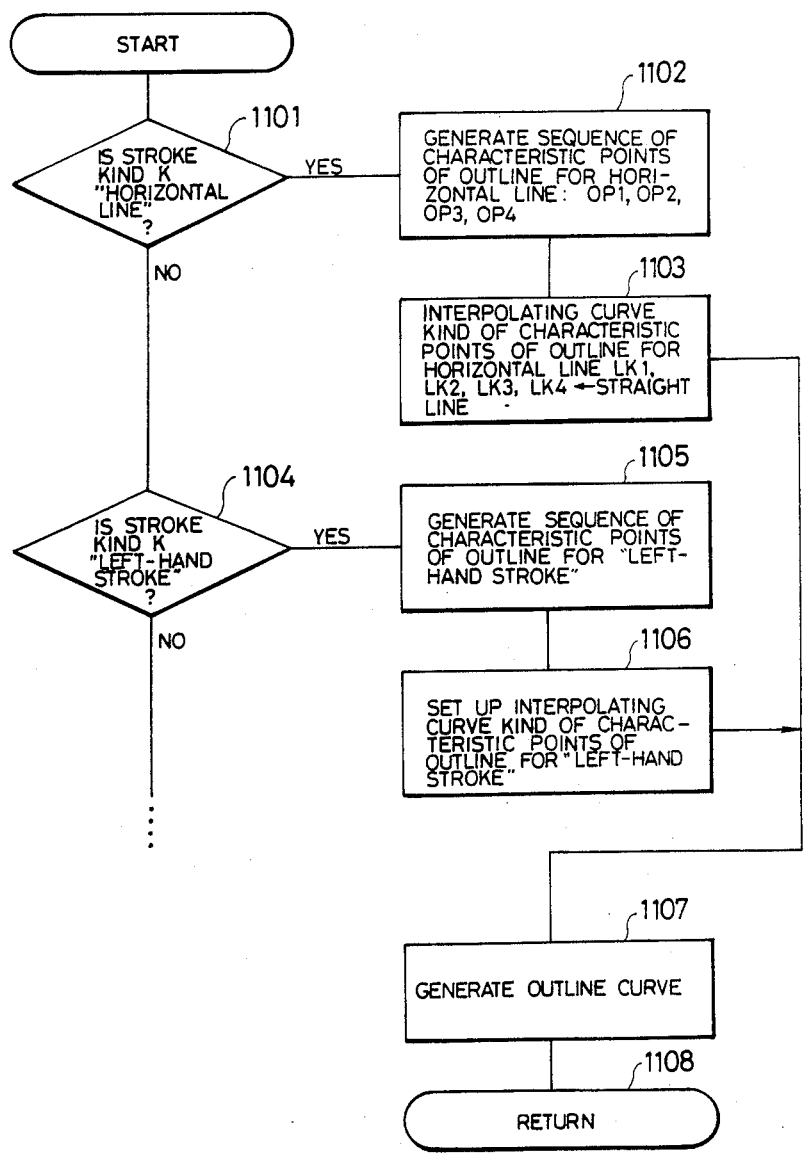
FIG. 11 is a flowchart showing the processing of a stroke outline generation routine.

Next, the processing 107 shown in FIG. 1 will be explained in more detail. FIG. 11 is a flowchart showing the structure of the stroke outline generation routine called from the processing 107 and part of the processing. First of all, the structure of this routine will be explained. The stroke kind of the stroke which is to be generated is judged, the sequence of the characteristic points of outline curve which is determined for each stroke kind is generated and the kind of interpolation curve connecting these characteristics points of outline curve is determined. Thereafter, the outline curve is generated commonly irrespective of the stroke kind. FIG. 11 shows the case where the stroke kind is the "horizontal-line" stroke and the case where it is the "lefthand-tail" stroke with processing for other stroke kinds being omitted.

Referring to FIG. 11, processing 1101 judges whether or not the stroke kind K of this stroke is the "horizontal-line". If it is, the flow proceeds to processing 1102 and if not, to processing 1104. When this stroke kind k is the "horizontal-line", processing 1102 determines the four points, i.e. OP1, OP2, OP3 and OP4 as the sequence of its characteristic points of outline by the parameters PP, A, RWP and LWP. This processing will be explained more definitely by referring once again to FIG. 5.

In FIG. 5, (5-2) represents the skeleton pattern of the character "T". Points 53 and 54 represent the skeleton points of the "horizontal-line" stroke. The parameter PP is the sequence of the coordinate (X, Y) of these two points. The parameter A, that is, the angle of direction of thickening, represents the thickening direction at these two points. It will be assumed hereby that each angle is 90°, and that the width W and zero are designated as the thickness in the right direction and as the thickness in the left direction, respectively. At this time, the characteristic points of outline OP1, OP2, OP3 and OP4 obtained by processing 1102 are points 55, 56, 53 and 54 in (5-4), respectively. The point 55 exists at the distance W from the skeleton line connecting the points 53 to 54 at an angle 90° on the right side of the skeleton line. Similarly, the point 56 exists at the position of the distance W from the point 54 on its right side. The reason why the skeleton point 53 itself is OP3 is that OP3 is obtained as the point of the distance zero in the left direction from the point 53. This also holds true of the point 54. The above determines the coordinate values of the characteristic points of outline OP1, OP2, OP3 and OP4 of this "horizontal-line" stroke.

Next processing 1103 determines the kind of the curve connecting these characteristic points of outline curve. Symbol LK1 represents the curve connecting OP1 to OP2, LK2 is the curve connecting OP3 to OP4, LK3 is the curve connecting OP1 to OP3, and LK4 is the curve connecting OP2 to OP4. In the case of the "horizontal-line" stroke, the kind of line of all of these four curves are "straight line". Processing 1107 is one that generates the outline curve on the basis of the sequence of characteristic points determined above and the kind of the interpolation curve between the characteristic points that connects them. The kind of the interpolation curve includes the "straight line", the "arc", the "spline curve", and so forth. In the case of the "horizontal-line" stroke, the kind of the interpolation curve is the "straight line" connecting the two characteristic points of outline curve. In the case of the later-appearing "lefthand-tail stroke", the "spline curve" connecting three characteristic points of outline curve is determined as the kind of the interpolation curve for these three characteristics points. It is possible to generate the outline curve on the basis of the kind of the interpolation curve and the sequence of the characteristic points in accordance with known graphic processing technique.

After the outline curve is thus generated by processing 1107, it is returned to the processing calling this routine by processing 1108. When the stroke kind of stroke K is the "lefthand-tail stroke" in processing 1104, the flow proceeds to processing 1105 to processing 1106. Processing 1105 determines the direction of thickening of this "lefthand-tail" stroke on the basis of the parameters PP, A, RWP and LWP, sets this thickness and executes the processing which determines the characteristic points of outline curve. Next, processing 1106 sets the kind of the interpolation curve between these characteristic points of outline curve and then the flow proceeds to processing 1107. When the stroke kind K is not the "lefthand-tail" stroke in processing 1104, too, the sequence of the characteristic points of outline curve of this stroke is similarly generated for each of other stroke kinds and sets the kind of the interpolation curve between these characteristic points and the flow proceeds then to processing 1107. The above explains the summary of processing 107. Next, the thickening processing of the stroke which is more complicated than the "horizontal-line stroke" and the outline pattern generation based on its result will be described about the case where the stroke kind is the "lefthand-tail" stroke with reference to FIG. 12.

Figure 12:
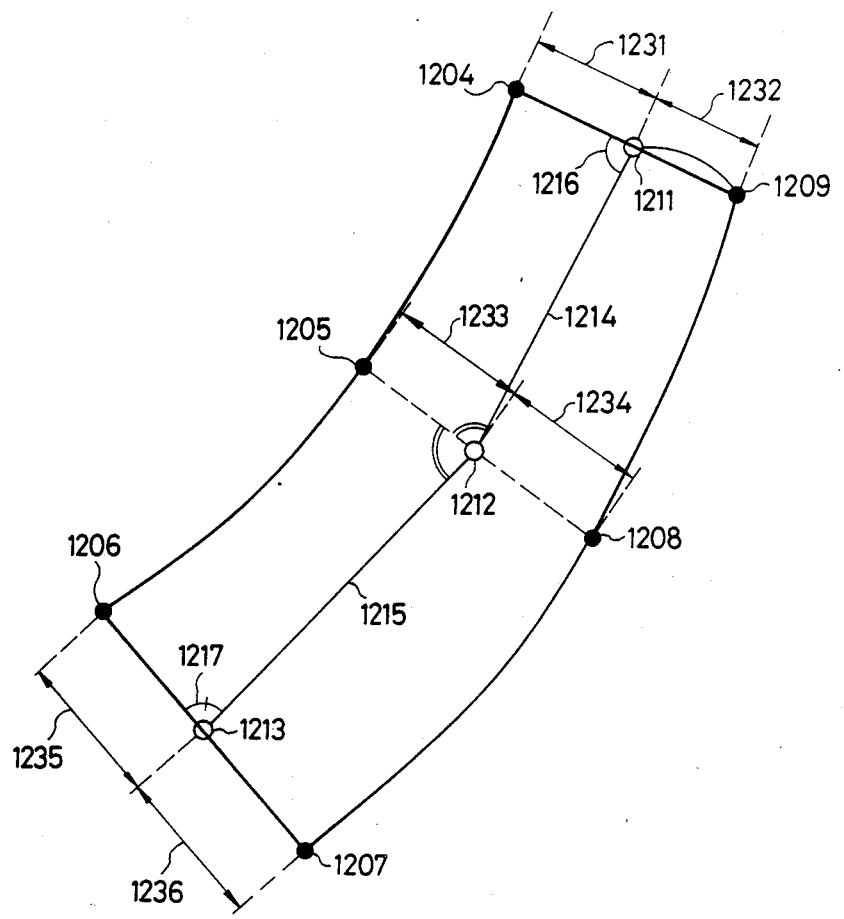
FIG. 12 shows the thickening processing in a "left-hand-tail stroke"

FIG. 12 is a diagram showing the skeleton line data and thickness data of the "lefthand-tail" stroke and the relation between the resulting characteristic points of outline curve and the interpolation curve connecting them. The skeleton points of the "lefthand-tail" stroke are three and are given by reference numerals 1211, 1212 and 1213 in order named. Ordinarily, they do not exist on one straight line. Usually, the skeleton point 1213 exists on the right side on the extension of the skeleton line 1214 connecting the skeleton point 1211 to the skeleton point 1212 when viewed from the skeleton point 1211. Two angles of direction of thickening are given. They represent sequentially the angles of direction of thickening at the first skeleton point 1211 and the third skeleton point 1213. If the skeleton line connecting the second skeleton point 1212 and the third skeleton point 1213 is 1215, the direction of the internal bisector of the angle between the skeleton line 1214 and the skeleton line 1215 at the second skeleton point 1212 is the direction of thickening at the second skeleton point.

Referring to FIG. 12, the points 1211, 1212 and 1213 are the skeleton points of this "lefthand-tail" stroke and are given as the product or multiplication $PP=(P_x, P_y)$ obtained by multiplying the sequence P of the coordinate value given as the skeleton point data of this stroke of this character by the scaling factor S, to the stroke outline generation routine. Next, the angle 1216 and the angle 1217 are the sequence A of the angles of direction of thickening of this stroke of this character. Furthermore, the width 1231 and the width 1232 are the right direction thickness and left direction thickness at the skeleton point 1211 and are given as the right direction thickness and left direction thickness of this stroke of this character. Similarly, the width 1233 and the width 1234 are given as the right and left direction thickness of the skeleton point 1212 and the width 1235 and the width 1236 are given as the right and left direction thickness of the skeleton point 1236.

The parameter RWP to the stroke outline generation routine is the sequence of the right direction thickness of the three skeleton points described above and LWP is the sequence of the left direction thickness of the three skeleton points. The characteristic points of outline curve 1204 and 1209, and 1206 and 1207 are generated by the information described above as is obvious from the explanation given with reference to FIG. 9. The characteristic points of outline curve 1205 and 1208 are generated for the skeleton point 1212 as is obvious from the determination method of the thickening direction given above. In this manner, all the characteristic points of outline curve shown in FIG. 12 are generated. The above explains the processing which corresponds to the processing 1105 shown in FIG. 11.

The next processing 1106 determines the kind of line between the characteristic points of outline curve and delivers the kind to processing 1107. Kind of each line is determined in accordance with the stroke kind. In the case of the "lefthand-tail" stroke, the kind of line "spline curve" is given to the sequence of points 1204, 1205 and 1206, the kind of line "straight line" is given to the sequence of points 1206 and 1207, the kind of line "spline curve" is given to the sequence of points 1207, 1208 and 1209 and the kind of line "straight line" is given to the sequence of points 1209 and 1204. The above corresponds to the processing 1106. The description given above explains the method of thickening processing for the stroke which is more complicated than the afore-mentioned "horizontal-line" stroke with reference to the example of the "lefthand-tail" stroke. Thus, the explanation of the character pattern generation processing 606 of one character with reference to the flowcharts of FIGS. 1, 10 and 11 is complete.

In accordance with this embodiment, it is possible to change the thickening method for each stroke of a character, to establish the balance of the line positions between the characters as described already and to prevent breakdown of the blank portion inside the same character. Another effect of this embodiment is that since the right and left thickness and the angle of direction of thickening can be designated for each stroke of each character, design of diversified character shapes can be made.

Next, some other embodiments of the present invention which can provide other effects by somewhat modifying the method of thickening processing while employing fundamentally the same character outline pattern generation method as that of the first embodiment will be described.

(1) The thickness information for each stroke in FIG. 4 is kept for all the strokes constituting the character in the embodiment described above. This is changed so as to hold the normal thickness information for each stroke kind as shown in FIG. 8. If the stroke of each character is in agreement with this normal value, the portion of the thickness information of this stroke of this character is omitted. In other words, the information from the field of the stroke number of this stroke in FIG. 4 to the field immediately before the field of the stroke number of the next stroke is omitted. The influences exerted by this change on the stroke outline generation processing are as follows. In processing 105 in FIG. 1, the angle of direction of thickening of this stroke and the sequence of thickness are determined from the thickness information as in the embodiment described above. If the thickness information corresponding to this stroke does not exist, the normal thickness information corresponding to the stroke kind shown in FIG. 8, which is separately stored in the disc storage 23 and is read into the main memory 21 by processing 601, is indexed by the stroke kind of this stroke in order to obtain the corresponding angle sequence of direction of thickening or the sequence of thickness or both, and the result is set as A and W. In accordance with this modified embodiment, it is possible to obtain the effects such as the reduction of the memory capacity for the thickness data and facilitation of uniform change of the design of character sets in addition to the effects of the first embodiment.

(2) The next modified embodiment does not distinguish the left direction thickness and the right direction thickness as the thickness information. In this case, the information in the form shown in FIG. 13 is used in place of the thickness information shown in FIG. 4 in the afore-mentioned embodiment. The only difference of FIG. 13 from FIG. 4 lies in that there is no distinction between the right and left thickness information. With this change, only "1" is used as the identifier of the thickness information. Needless to say, this change may be made conjointly with the change of the item (1) described above. In this case, the normal thickness information corresponding to the stroke kind of FIG. 8 is changed in the same way. Now, there are the following two methods as the processing method of determining the right direction thickness and the left direction thickness on the basis of the thickness information after this change. (2.1) The first is the processing method which determines the right and left direction thickness in accordance with the stroke kind and its skeleton point coordinate. It has the right direction thickness range ($Y_{R1}$, $Y_{R2}$) and the left direction thickness range ($Y_{L1}$, $Y_{L2}$) for the skeleton point contained by each stroke kind. When the outline points for the skeleton points of the stroke of this stroke kind are generated, the thickness of the skeleton point of this stroke is set to RW when the Y coordinate Y of this skeleton point is $Y_{R1} \leq Y \leq Y_{R2}$ in the processing 105 and LW is set to zero (LW=0). When $Y_{L1} \leq Y \leq Y_{L2}$, the thickness of this skeleton point of this stroke is set to LW while RW is set to zero (RW=0). The half value of the thickness of this skeleton point is set equally to RW and LW in other cases. This method can be accomplished by holding ($Y_{L1}$, $Y_{L2}$), ($Y_{R1}$, $Y_{R2}$) after the field of thickness in FIG. 13. This also holds true of the case where the coordinate thickness information corresponding to the stroke kind is used. Processing after the determination of RW and LW is exactly the same as in the first embodiment. The effect of this modified embodiment is that the information quantity can be reduced when compared with the first embodiment. (2.2) This is the processing method which determines the right and left thickness in accordance with the stroke kind. The stroke kind in the first embodiment is further divided finely. For example, the "horizontal-line" stroke is divided finely into the "horizontal-line 1", "horizontal-line 2" and "horizontal-line 3". The "horizontal-line 1" thickens the line only in the right direction while the "horizontal-line 2" thickens the line only in the left direction. The "horizontal-line 3" thickens the line uniformly in both the right and left directions. The thickness information is assumed to provide the total of the right and left thickening width. In this method, the stroke kind described above is judged when RWP and LWP are determined in processing 106. Its detail is as follows. The stroke kind is classified into the three groups, i.e. the right thickening group, the left thickening group and the uniform thickening group. An arbitrary stroke kind belongs to any of these three groups. For example, the "horizontal-line 1", the "horizontal-line 2" and the "horizontal-line 3" described above belong to the right thickening group, the left thickening group and the uniform thickening group, respectively. The value of the thickness field is used as the right direction thickness RW for the stroke of the stroke kind belong to the right thickening group with LW=0. The value of the thickness field is used as the left direction thickness LW for the stroke of the stroke kind belonging to the left thickening group with RW=0. The half value of the value of the thickness field is set to RW and LW for the stroke belonging to the uniform thickening group. The subsequent processing is the same as that of the first embodiment. The effect of this method is that the memory capacity for the thickness information can be reduced in comparison with the first embodiment.

According to the present invention described above, a high quality character pattern can be generated from the skeleton pattern data and thickness data for the character set. Since thickening processing can be accomplished without changing the position of a specific character outline curve inside the character box by changing the thickness data, it is possible to insure the balance of the positions of various lines inside the character and the positions of various lines between the characters. In this manner, the characters having various thickness can be generated from a single skeleton line data without deteriorating character quality.

What is claimed is:

1. A character pattern generation method in a character pattern generation system having means for storing skeleton line data and segments of stroke thickness data representative of a character comprising the steps of:

reading out a coordinate value in a coordinate sequence of skeleton points from the skeleton line data previously stored in the means for holding skeleton line data;

reading out the thickness data of the segment of stroke defined by said coordinate value and its subsequent skeleton point in said coordinate sequence, said thickness data being previously stored in connection with the viewing direction of each of said skeleton points to the respective subsequent skeleton point;

obtaining a basic reference of said segment of stroke in accordance with at least a group of characters to which said segment of stroke pertains with said basic reference containing at least an upper limit and a lower limit common to a plurality of characters; and, thickening said segment of stroke, in accordance with said thickness data and said basic reference.

2. A character pattern generation method according to claim 1, wherein said step of thickening is a step selected from at least three methods of thickening, said three methods of thickening comprising (1) thickening in accordance with the previously stored thickness data, (2) deciding thickness of at least one side of right side and left side relative to said viewing direction, in accordance with its stroke kind which identifies a type of shape of said segment of stroke, and (3) deciding thickness of at least one side of right side and left side relative to said viewing direction, in accordance with said coordinate value and said basic reference.

3. A character pattern generation method according to claim 2, wherein said method comprises a method which thickens said stroke in the right direction relative to said viewing direction, a method which thickens said stroke in the right and left directions by half of said thickness data, and a method which thickens said stroke in the left direction relative to said viewing direction.

4. A character pattern generation method according to claim 2, which further includes a step of reading out thickening width, said thickening width being in said thickness data previously stored, in both right and left directions relative to said viewing direction, said thickening width being identifiably stored for each line of each character.

5. A character pattern generation method according to claim 1, wherein said basic reference is a previously defined reference line for the character which said segment of stroke pertains.

6. A character pattern generation method according to claim 1, wherein said basic reference is a stroke kind of said stroke, said stroke kind identifying a type of shapes of stroke lines constituting at least one of said plurality of characters.

7. A character pattern generation method according to claim 1, wherein said thickness data are stored as normal values common to a plurality of characters.

8. A character pattern generation system having means for holding skeleton line data of characters, comprising:

memory means for storing a coordinate sequence of skeleton points obtained in connection with said skeleton line;

memory means for storing thickness data of a segment of stroke defined by a coordinate pair of neighboring coordinates in said coordinate sequence, in connection with the viewing direction of said skeleton point to its subsequent skeleton point in said coordinate pair;

means for obtaining a basic reference for said segment of stroke in accordance with at least a group of characters to which said stroke pertains; and, means for thickening said segment of stroke, generating its thickened stroke in accordance with said thickness data and said basic reference.

9. A character pattern generation system according to claim 8, wherein said means for thickening comprises a means for selecting from at least three means of thickening, said three means of thickening comprising: (1) thickening means in accordance with th e previously stored thickness data, (2) deciding means of thickness of at least one side of right side and left side relative to said viewing direction, in accordance with its stroke kind which identifies a type of shape of said segment of stroke, and (3) deciding means of thickness of at least one side of right side and left side relative to said viewing direction, in accordance with said coordinate value and said basic reference.

10. A character pattern generation system according to claim 8, wherein said basic reference is a previously defined reference line for the character to which said stroke pertained.

11. A character pattern generation method according to claim 8 wherein said basic reference is a stroke kind of said stroke, said stroke kind identifying a type of shapes of stroke lines constituting at least one of said plurality of characters.

12. A method for generating a character comprised of a pattern including a plurality of character segment strokes wherein the segment strokes have varying thicknesses in accordance with a preselected font system, comprising the steps of:

defining the character pattern with skeleton line data representative of the character, the skeleton line data including a plurality of coordinate values in a coordinate sequence of skeleton points;

determining a scaling factor of said character pattern according to a specified output size;

determining a thickness of the character segment strokes, said determining comprising setting a viewing direction of the skeleton point to a next sequential skeleton point and setting a thickness of the segment stroke from preselected thickness data associated with the font system;

generating the character by thickening the segment strokes in accordance with the skeleton line data, thickness data and scaling factor whereby the character may be perceived by print or display.

* * * * *